US012682576B2

(12) United States Patent  
Watanabe

(10) Patent No.: US 12,682,576 B2  
(45) Date of Patent: Jul. 14, 2026

(54) INFORMATION PROCESSING APPARATUS INFORMATION PROCESSING METHOD AND STORAGE MEDIUM

(71) Applicant: CANON KABUSHIKI KAISHA, Tokyo (JP)

(72) Inventor: Takabumi Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 18/747,713

(22) Filed: Jun. 19, 2024

(65) Prior Publication Data

US 2024/0338899 A1 Oct. 10, 2024

Related U.S. Application Data

(63) Continuation of application No. PCT/JP2022/045326, filed on Dec. 8, 2022.

(30) Foreign Application Priority Data

Dec. 20, 2021 (JP) ................................. 2021-206251

(51) Int. Cl.
*G06T 19/00* (2011.01)
*G06T 15/20* (2011.01)
*G06T 19/20* (2011.01)

(52) U.S. Cl.
CPC ............ *G06T 19/003* (2013.01); *G06T 15/20* (2013.01); *G06T 19/20* (2013.01); *G06T 2210/62* (2013.01); *G06T 2219/024* (2013.01); *G06T 2219/2012* (2013.01)

(58) Field of Classification Search
None
See application file for complete search history.

(56) References Cited

U.S. PATENT DOCUMENTS

| | | | | |
|---|---|---|---|---|
| 12,211,151 B1* | 1/2025 | Chiou | ................... | G06T 19/003 |
| 2018/0374276 A1* | 12/2018 | Powers | ................. | G06T 17/205 |
| 2022/0036656 A1* | 2/2022 | Garcia | ................... | G06T 19/20 |
| 2024/0007477 A1* | 1/2024 | Shishido | .............. | H04L 63/105 |

FOREIGN PATENT DOCUMENTS

| | | |
|---|---|---|
| JP | 2006079174 A | 3/2006 |
| JP | 2018106298 A | 7/2018 |

* cited by examiner

*Primary Examiner* — James A Thompson

(74) *Attorney, Agent, or Firm* — Canon U.S.A., Inc. IP Division

(57) ABSTRACT

An information processing apparatus that shares with another user a space where a virtual three-dimensional model is presented includes at least one processor and/or at least one circuit configured to acquire information about an actual viewpoint of the another user, and generate a video effect based on the information about the actual viewpoint of the another user in a case where a virtual viewpoint of the another user is different from the actual viewpoint of the another user because a walk-through function is used.

16 Claims, 12 Drawing Sheets

INFORMATION PROCESSING APPARATUS INFORMATION PROCESSING METHOD AND STORAGE MEDIUM

CROSS-REFERENCE TO RELATED APPLICATIONS

This application is a Continuation of International Patent Application No. PCT/JP2022/045326, filed Dec. 8, 2022, which claims the benefit of Japanese Patent Application No. 2021-206251, filed Dec. 20, 2021, both of which are hereby incorporated by reference herein in their entirety.

BACKGROUND OF THE INVENTION

Field of the Invention

The present invention relates to an information processing apparatus an information processing method, and a storage medium.

Background Art

Recently, virtual reality (VR), mixed reality (MR), and augmented reality (AR) have been widely used. VR, MR, and AR have a function of enabling a user to move only a viewpoint from which a virtual three-dimensional model is drawn (hereinbelow referred to as a virtual viewpoint) by a user operation, for example, with respect to a building and a huge structure represented by the virtual three-dimensional model. Such a function of enabling a user to move a virtual viewpoint by a user operation is referred to as a walk-through function. The walk-through function enables a user to observe various locations without having to move him/herself. In order to smoothly use the walk-through function, it is desirable that a user can understand a positional relationship between the user him/herself and a virtual three-dimensional model to observe.

According to Patent literature 1, a virtual reality presentation device is discussed that is provided with an actual-size observation mode in which an observer performs observation by being immersed in a virtual three-dimensional space in an actual size and a reduced-size observation mode in which the observer performs observation by reducing a virtual three-dimensional space computer graphics (CG) image. The virtual reality presentation device according to Patent literature 1 presents a CG map to which position and orientation information of a user is added in the reduced-size observation mode, so that the user can understand where he or she is in the virtual three-dimensional space.

Citation List

Patent Literature

PTL 1: Japanese Patent Application Laid-Open No. 2006-79174

In MR and AR in which a virtual three-dimensional model is displayed by being superimposed on a real space, if the walk-through function is used, a virtual viewpoint is moved, so that a position discrepancy occurs between the real space and the virtual three-dimensional model. Here, a case is assumed in which a plurality of people observes a virtual three-dimensional model. At this time, if a specific user uses the walk-through function, a discrepancy occurs between an actual viewpoint of the head of the user during the walk-through (hereinbelow, referred to as an actual viewpoint)

viewed from other users and a virtual viewpoint from which a three-dimensional model is drawn to be displayed to the user during the walk-through. Thus, an issue arises in that the other users cannot understand a gazing point on the virtual three-dimensional model of the user during the walk-through, making communication difficult.

SUMMARY OF THE INVENTION

The present invention is directed to elimination of a discrepancy in a relationship between a virtual viewpoint and an actual viewpoint of another user in view of the above-described issue.

An information processing apparatus that shares with another user a space where a virtual three-dimensional model is presented includes at least one processor and/or at least one circuit configured to acquire information about an actual viewpoint of the another user, and generate a video effect based on the information about the actual viewpoint of the another user in a case where a virtual viewpoint of the another user is different from the actual viewpoint of the another user because a walk-through function is used.

Further features of the present invention will become apparent from the following description of exemplary embodiments with reference to the attached drawings.

DESCRIPTION OF THE EMBODIMENTS

Exemplary embodiments of the present invention will be described below with reference to the attached drawings.

Figure 1:
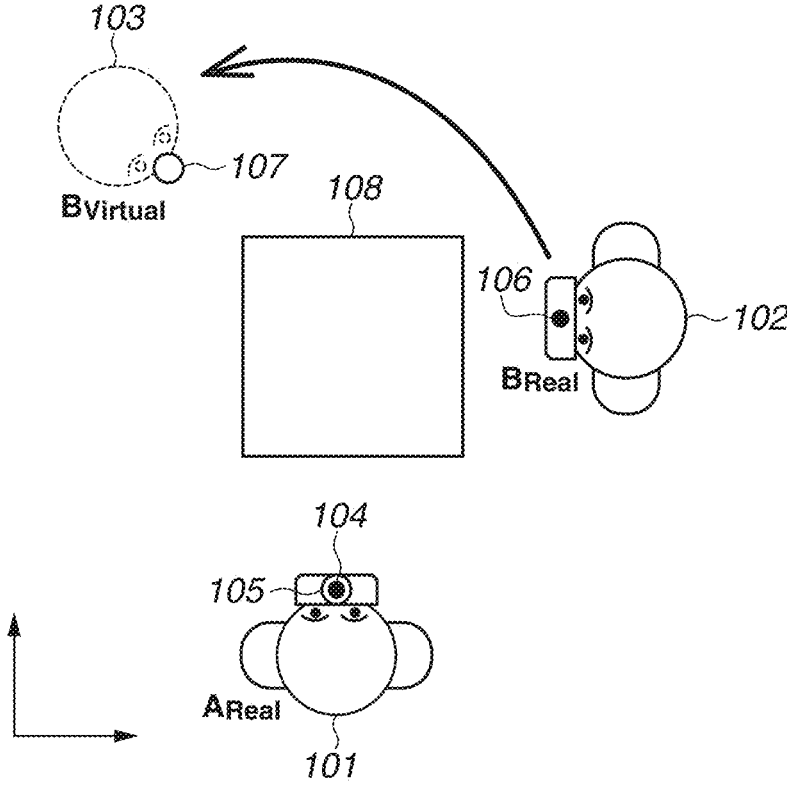
FIG. 1 is a schematic diagram illustrating a case where a specific user uses a walk-through function.

FIG. 1 is a plan view schematically illustrating a positional relationship in a case where a plurality of people observes a virtual three-dimensional model in which a specific user uses a walk-through function. Here, a user A 101 and a user B 102 share a space in which a virtual three-dimensional model is presented. The user A 101 is an own user, and the user B 102 is another user. The user A 101 has an actual viewpoint 104 and a virtual viewpoint 105 at the same position. On the other hand, the user B 102 uses the walk-through function, so that an actual viewpoint 106 and a virtual viewpoint 107 are different. An avatar 103 of the user B is displayed at a position of the virtual viewpoint 107 of the user B 102. If the user A 101 views this situation from the actual viewpoint 104, the virtual viewpoint 107 of the user B 102 is on a left side of a virtual model 108 although the actual viewpoint 106 of the user B 102 is on a right side of the virtual model 108. This makes it difficult for the user A 101 to understand a position of the user B 102.

According to each exemplary embodiment described below, in a case where a virtual viewpoint of another user is different from an actual viewpoint thereof, a video effect is generated based on information about the actual viewpoint of the another user, so that a discrepancy in a relationship between the virtual viewpoint and the actual viewpoint of the another user is eliminated.

First Exemplary Embodiment

According to the present exemplary embodiment, a video effect is generated based on information about an actual viewpoint of another user during a walk-through. Specifically, an image indicating that a virtual viewpoint of the another user does not exist is presented at a position corresponding to the actual viewpoint of the another user. An own user can recognize the image indicating that the virtual viewpoint of the another user does not exist when viewing the position corresponding to the actual viewpoint of the another user, so that the own user can easily understand that the virtual viewpoint of the another user is not located at the position of the actual viewpoint.

Figure 4:
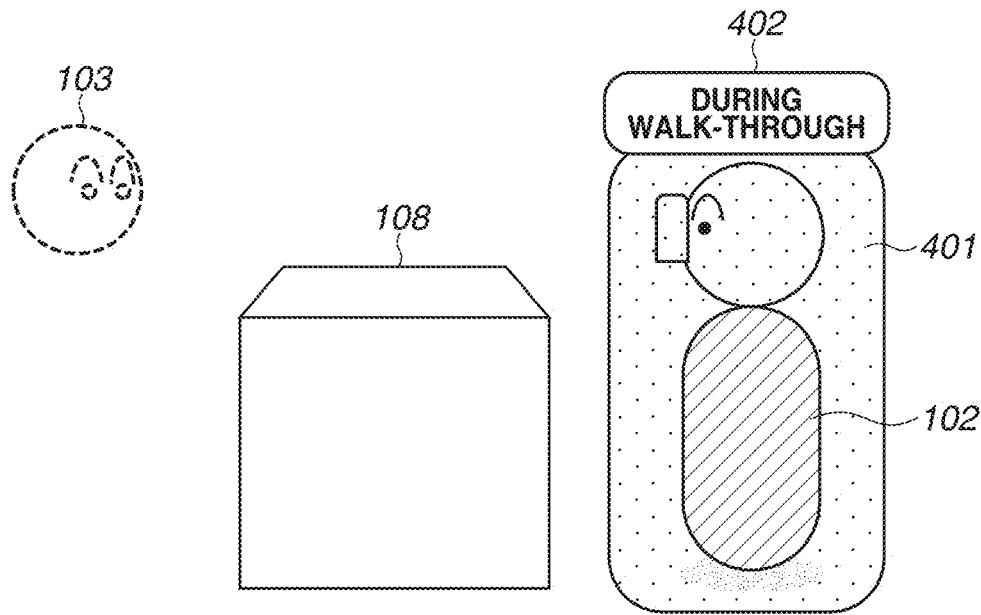
FIG. 4 schematically illustrates a mixed reality image viewed from an own user.

FIG. 4 schematically illustrates a mixed reality image viewed from the actual viewpoint of the user A 101. A positional relationship of each object such as the avatar 103 and the virtual model 108 corresponds to FIG. 1.

The user B 102 is on a walk-through, and the avatar 103 of the user B 102 is displayed at a position and orientation of the virtual viewpoint of the user B 102. Here, the position and orientation refers to a position and an orientation (direction). In addition, color of an area 401 surrounding a body of the user B 102 is changed. Text information 402 indicating as "during walk-through" is displayed near the area 401.

Figure 2:
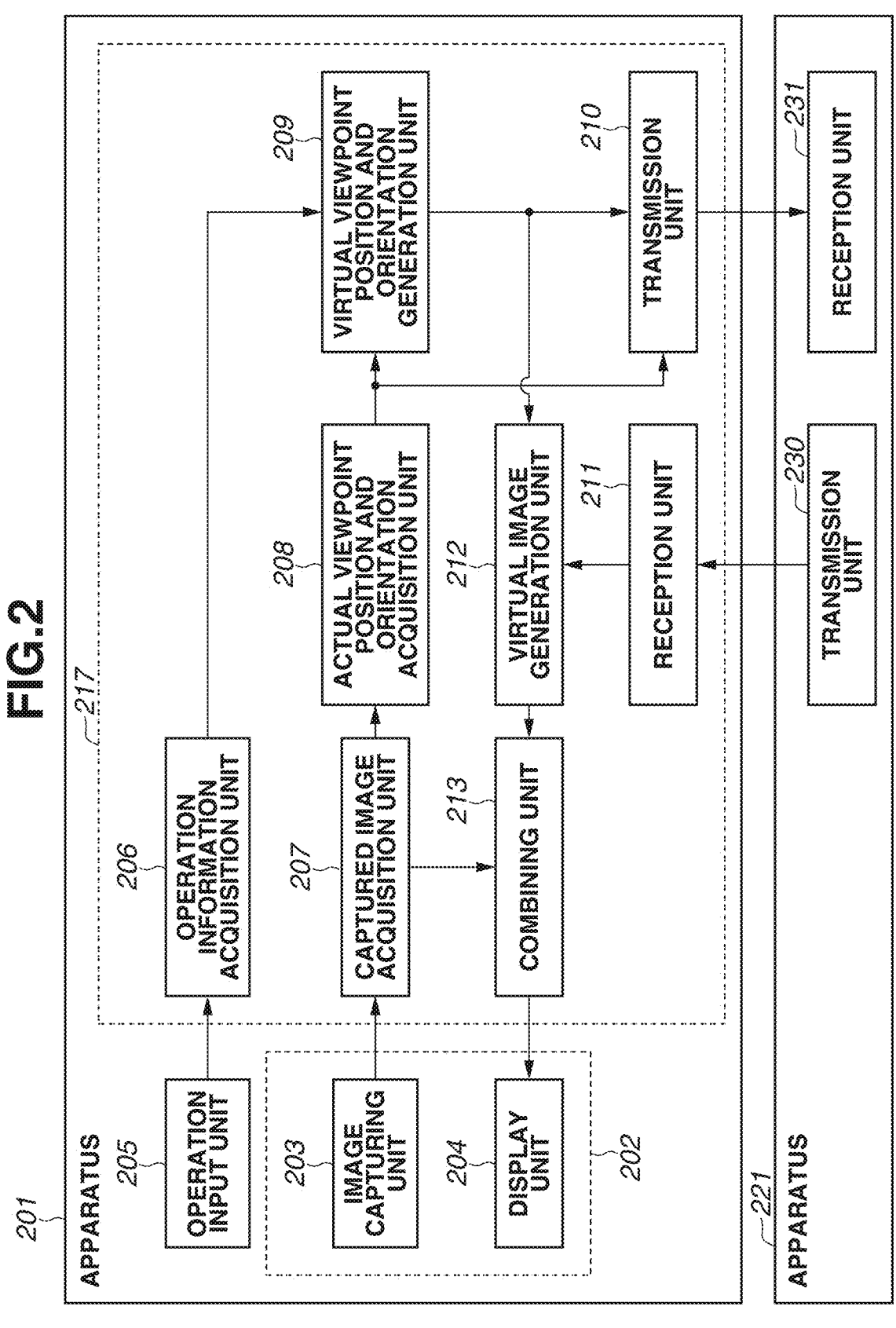
FIG. 2 illustrates a functional configuration of an information processing system according to a first exemplary embodiment.

FIG. 2 illustrates an example of a functional configuration of an information processing system.

The information processing system can achieve mixed reality or augmented reality in which a plurality of people observes a virtual three-dimensional model by coordinating an apparatus used by each user with each other via a transmission unit and a reception unit installed in each apparatus. The information processing system illustrated in FIG. 2 assumes that there are two users and has a configuration in which two apparatuses, an apparatus 201 and an apparatus 221, are coordinated with each other. In a case where three or more people observe the virtual three-dimensional model, three or more apparatuses are coordinated with each other. The exemplary embodiment in a case where there are two users is described below.

The apparatus 201 includes a terminal 202, an operation input unit 205, and an information processing apparatus 217.

The terminal 202 captures an image of a surrounding real environment and presents a mixed reality image to a user. The terminal 202 includes an image capturing unit 203 and a display unit 204.

The image capturing unit 203 captures an image of the surrounding real environment. The display unit 204 presents a mixed reality image to a user.

As the terminal 202 according to the present exemplary embodiment, a head mounted display (hereinbelow, referred to as HMD) is used in which the image capturing unit 203 and the display unit 204 are installed in a head-mounted housing. A user wears the HMD on the head, and the HMD moves in conjunction with a user's movement and head movement. The terminal 202 may be a tablet terminal, a smartphone terminal, or the like. The terminal 202 according to the present exemplary embodiment is a video see-through type in which a virtual three-dimensional model is superimposed on a real image captured by the image capturing unit 203 and displayed on the display unit 204, but it may be an optical see-through type.

The image capturing unit 203 includes a camera that captures an image to be presented to a user and a camera that acquires an image to estimate a position and orientation of the terminal 202.

In the image capturing unit 203, the same camera may have both a function of capturing an image and a function of acquiring an image to estimate the position and orientation. Further, the image capturing unit 203 can omit one or both of the two cameras depending on a method for acquiring the position and orientation of the terminal 202 and a method for superimposing a virtual three-dimensional model.

In the terminal 202 according to the present exemplary embodiment, a camera that captures an image to be presented to a user and a display device that presents a mixed reality image are individually installed for right and left eyes to achieve stereoscopic vision. In this regard, configurations of the camera and the display device installed in the terminal 202 can be changed according to a form of the terminal 202, the method for acquiring the position and orientation of the terminal 202, and the method for superimposing a virtual three-dimensional model.

The operation input unit 205 receives a setting operation of enabling a user to use the walk-through function and an operation of moving the virtual viewpoint input for the walk-through. Specifically, the operation input unit 205 receives one or a plurality of button inputs from a controller device, gesture inputs, voice inputs, and the like. The operation input unit 205 may be provided in the terminal 202 or may be configured as a separate device.

The information processing apparatus 217 is an apparatus for sharing a space in which a virtual three-dimensional model is presented with another user. The information processing apparatus 217 estimates the position and orientation of the terminal 202 and generates a mixed reality image.

The information processing apparatus 217 includes an operation information acquisition unit 206, a captured image acquisition unit 207, an actual viewpoint position and orientation acquisition unit 208, a virtual viewpoint position and orientation generation unit 209, a transmission unit 210, a reception unit 211, a virtual image generation unit 212, and a combining unit 213.

The operation information acquisition unit 206 acquires operation information received by the operation input unit 205.

The captured image acquisition unit 207 acquires a captured image capturing the real environment that is transmitted from the terminal 202 to the information processing apparatus 217.

The actual viewpoint position and orientation acquisition unit 208 acquires information about an actual viewpoint of the own user. Specifically, the actual viewpoint position and orientation acquisition unit 208 acquires the information about the actual viewpoint of the own user by calculating the position and orientation of the actual viewpoint of the own user from the captured image.

The virtual viewpoint position and orientation generation unit 209 generates information about a virtual viewpoint of the own user. Specifically, the virtual viewpoint position and orientation generation unit 209 generates the information about the virtual viewpoint of the own user by calculating the position and orientation of the virtual viewpoint based on the information about the actual viewpoint and the operation information acquired by the operation information acquisition unit 206.

The transmission unit 210 transmits the information about the position and orientation of the actual viewpoint of the own user and the information about the position and orientation of the virtual viewpoint of the own user to the apparatus 221.

The reception unit 211 receives information about a position and orientation of an actual viewpoint of the another user and information about a position and orientation of a virtual viewpoint of the another user from the apparatus 221.

The virtual image generation unit 212 generates a virtual three-dimensional model based on the information about the position and orientation of the virtual viewpoint of the own user, the information about the position and orientation of the actual viewpoint of the own user, the information about the position and orientation of the virtual viewpoint of the another user, and the information about the position and orientation of the actual viewpoint of the another user. Further, in a case where the another user is on the walk-through, in other words, the virtual viewpoint and the actual viewpoint of the another user are different, the virtual image generation unit 212 generates a video effect based on the information about the actual viewpoint of the another user.

The combining unit 213 combines a virtual image and a real environment image to generate a mixed reality image.

The apparatus 221 has the same configuration as the apparatus 201. Thus, the apparatus 221 includes an HMD as the terminal 202, which is worn on the head of the another user. Further, the apparatus 221 includes an information processing apparatus having the same configuration as the information processing apparatus 217 in the apparatus 201. In FIG. 2, a transmission unit 230 and a reception unit 231 configuring the information processing apparatus in the apparatus 221 are only illustrated.

Figure 3:
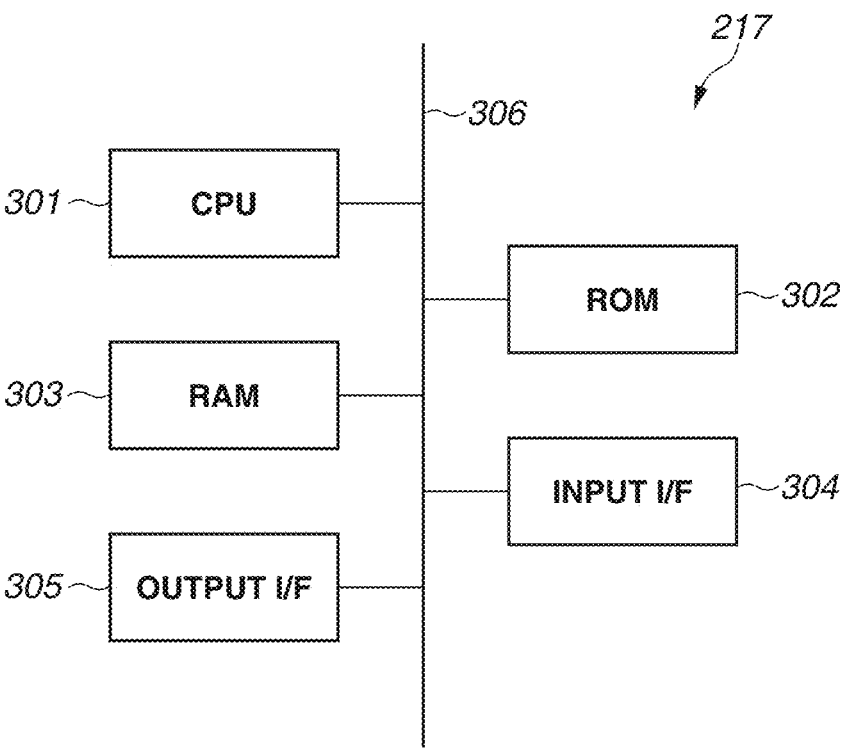
FIG. 3 illustrates a hardware configuration of an information processing apparatus.

FIG. 3 illustrates an example of a hardware configuration of the information processing apparatus 217.

The information processing apparatus 217 includes a central processing unit (CPU) 301, a read-only memory (ROM) 302, a random access memory (RAM) 303, an input interface (I/F) 304, and an output I/F 305. Each unit in the hardware configuration of the information processing apparatus 217 is connected to a bus 306.

The CPU 301 controls the entire information processing apparatus 217. Further, the CPU 301 loads a program stored in the ROM 302 into the RAM 303 and executes it, thereby realizing a functional configuration of the information processing apparatus 217 described above.

The ROM 302 stores a program executed by the CPU 301 and various kinds of data.

The RAM 303 temporarily stores a program if the CPU 301 executes the program stored in the ROM 302, and temporarily stores an execution result.

The input I/F 304 is an interface for inputting various kinds of data from a component in the apparatus 201 or from the apparatus 221. Specifically, the operation information from the operation input unit 205, the image captured by the image capturing unit 203, and information from the transmission unit 230 of the apparatus 221 are input to the information processing apparatus 217 via the input I/F 304.

The output I/F 305 is an interface for outputting various kinds of data to the component in the apparatus 201 or to the apparatus 221. Specifically, the information processing apparatus 217 outputs an image to the terminal 202 or outputs information to the reception unit 231 of the apparatus 221 via the output I/F 305.

The information processing apparatus 217 may be a stationary-type computer such as a personal computer or a workstation, or may be a portable computing device. Further, the information processing apparatus 217 may be integrated with the terminal 202.

Figure 5:
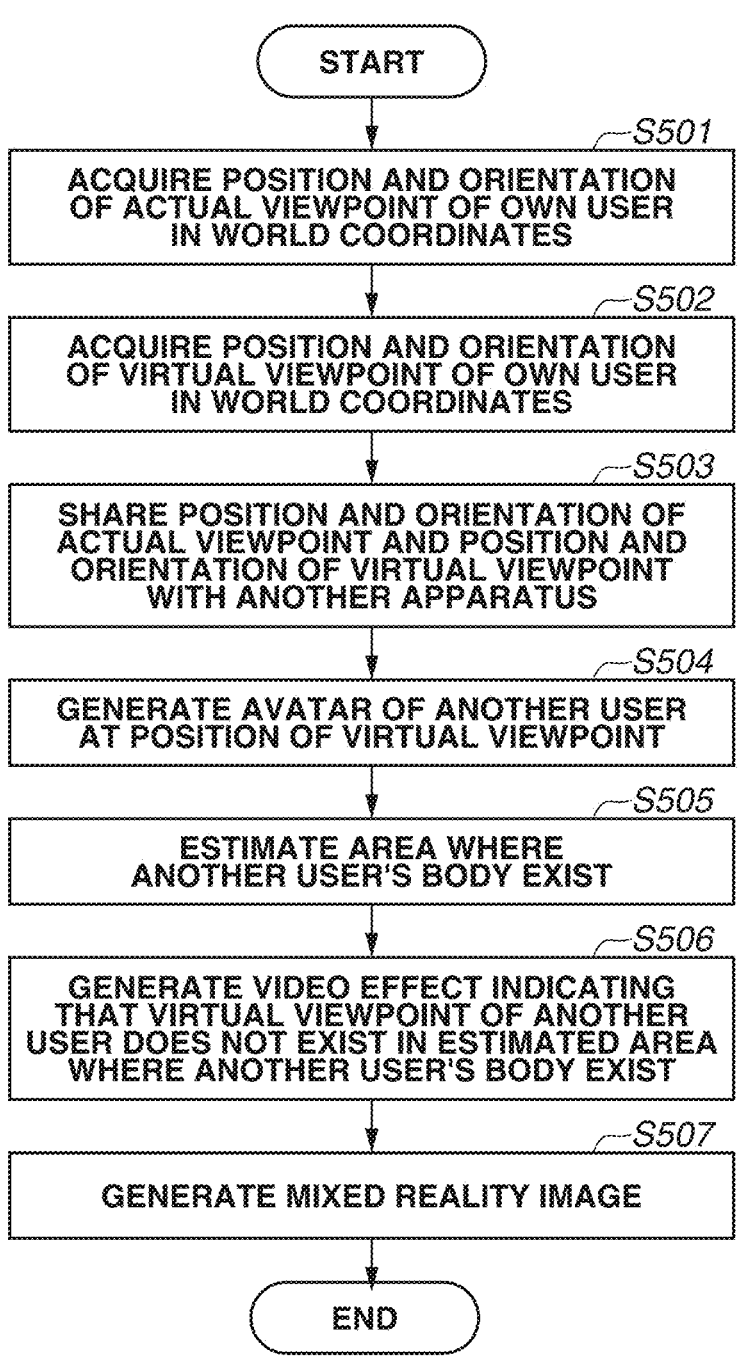
FIG. 5 is a flowchart illustrating processing by the information processing apparatus.

Next, an example of processing by the information processing apparatus 217 is described with reference to a flowchart in FIG. 5. Processing in each flowchart including FIG. 5 is achieved by the CPU 301 of the information processing apparatus 217 loading a program stored in the ROM 302 into the RAM 303 and executing it. Here, it is assumed that the own user and the another user set to use the walk-through function via the operation input unit 205.

In step S501, the actual viewpoint position and orientation acquisition unit 208 acquires the information about the position and orientation of the actual viewpoint of the own user in world coordinates as the information about the actual viewpoint of the own user. Here, as a method for acquiring the information about the position and orientation of the actual viewpoint, there is a method for estimating, based on an image capturing a marker arranged in a space, the position and orientation of the actual viewpoint from arrangement of a feature point of the marker in the image. Further, there is a method for using simultaneous localization and mapping (SLAM) that simultaneously estimates a self location and creates an environment map using a natural feature point in a real image. Furthermore, the information about the position and orientation of the actual viewpoint may be acquired using an external measurement apparatus such as a motion capture apparatus.

The origin and orientation of the world coordinate system are determined in advance using a marker or a specific real object. Further, the origin and orientation of the world coordinate system are set to be common among a plurality of users.

In step S502, the virtual viewpoint position and orientation generation unit 209 generates the information about the position and orientation of the virtual viewpoint of the own user in the world coordinates as the information about the virtual viewpoint of the own user. Specifically, the virtual viewpoint position and orientation generation unit 209 calculates a viewpoint movement amount based on the operation information acquired by the operation information acquisition unit 206. Next, the virtual viewpoint position and orientation generation unit 209 calculates information about the position and orientation of the virtual viewpoint of the own user in the world coordinates by adding the calculated viewpoint movement amount to the position and orientation of the actual viewpoint of the own user in the world coordinates.

A method for associating the viewpoint movement amount from the operation information is not particularly limited. Further, in a case where an apparatus configuring the operation input unit 205 or an apparatus configuring the actual viewpoint position and orientation acquisition unit 208 can acquire a position and orientation of a body part, such as a hand of the own user, the viewpoint movement amount is also added to the position and orientation of the body part and can be used to generate an avatar, which will be described below.

In step S503, the transmission unit 210 transmits the information about the actual viewpoint and the information about the virtual viewpoint of the own user to the apparatus 221. Further, in a case where the information about the position and orientation of the body part is acquired in step S502, the transmission unit 210 transmits the information about the position and orientation of the body part of the own user and information acquired by adding the viewpoint movement amount to the position and orientation of the body part.

The reception unit 211 receives the information about the actual viewpoint and the information about the virtual viewpoint of the another user from the apparatus 221. Further, in a case where the apparatus 221 acquires the information about the position and orientation of the body part of the another user, the reception unit 211 receives the information about the position and orientation of the body part of the another user and the information acquired by adding the viewpoint movement amount to the position and orientation of the body part.

Accordingly, the apparatus 201 and the apparatus 221 can share the information about the actual viewpoint of the user and the like with each other.

In step S504, the virtual image generation unit 212 generates an avatar based on the information about the position and orientation of the virtual viewpoint of the another user. The virtual image generation unit 212 may generate an avatar with only a head or an avatar to which representations of body parts, such as a torso and legs, are added to positions inferred from a head position. Further, in a case where the information acquired by adding the viewpoint movement amount to the position and orientation of the body part of the another user is received, the virtual image generation unit 212 may generate an avatar to which a representation of a virtual body part of the another user moved by the walk-through is added based on the received information. Identification information may be added near or superimposed on the avatar to identify the user. The identification information includes, for example, a user name, a user identification (ID), and a texture indicating a feature of the user.

In step S505, the virtual image generation unit 212 estimates an area where the another user's body exists based on the information about the position and orientation of the actual viewpoint of the another user. Specifically, the virtual image generation unit 212 estimates an area including the head using an ellipsoidal shape based on the information about the position and orientation of the actual viewpoint of the another user in the world coordinate system. Further, for a whole body area other than the head, the virtual image generation unit 212 estimates that feet exist at a predetermined distance vertically downward from the viewpoint position based on vertical or floor surface information acquired by defining a vertical direction or estimating a floor surface. Next, the virtual image generation unit 212 determines a column that exists at a predetermined radius around a vertical axis connecting the feet and head as the whole body area where the another user's whole body is included. In order to define the vertical direction or to estimate the floor surface, there are a method for setting the origin of the world coordinate system to the floor surface in step S501 to adjust the vertical direction to a specified direction, and a method for estimating the floor surface using the natural feature point of SLAM. An orientation sensor may be installed in the terminal 202 to estimate the vertical direction, or other methods may be used. In a case where the information about the position and orientation of the body part of the another user is received, the virtual image generation unit 212 may appropriately modify or add the area where the another user's body exists based on the received information.

The body area may be estimated by combining three-dimensional polyhedrons in the world coordinate system, or may be estimated on a two-dimensional image to be presented to the own user. In this case, based on the position of the viewpoint on the world coordinates, a foot position of the another user estimated by the above-described method, and, if the information about the position and orientation of the body part of the another user are received, the received information, an image to be presented to the own user is projected onto the two-dimensional image. The virtual image generation unit 212 may generate a polygon including the body area of the another user on projected two-dimensional coordinates. However, a shape of the area of the another user is not limited and may be any shape.

In step S506, the virtual image generation unit 212 generates a video indicating that the virtual viewpoint of the another user is different from the actual viewpoint of the another user at a position corresponding to the actual viewpoint of the another user. According to the present exemplary embodiment, the virtual image generation unit 212 generates a video indicating that the virtual viewpoint of the another user does not exist in the area where the another user's body exists.

Specifically, the virtual image generation unit 212 generates an image in which color of the area estimated in step S505 is changed to a different color.

For example, the color of the area can be changed by adding color to the estimated area and drawing it. The virtual image generation unit 212 may achieve the color change by drawing the three-dimensional polyhedron generated in step S505 as it is or by superimposing a specific texture image within the estimated area or within an area of the three-dimensional polyhedron.

Further, for example, the color of the area can be changed by generating a mask using the estimated area and changing the color of the real image corresponding to a mask area. The color change can be achieved by the combining unit 213 combining the real image of which the color is changed by the virtual image generation unit 212 with the real environment image.

In order to change the color of the estimated area, at least one of saturation and brightness of the estimated area may be reduced to represent that the virtual viewpoint of the another user does not exist. The method for changing the color of the estimated area is not particularly limited, and any method may be used.

The virtual image generation unit 212 generates text information indicating that the another user does not exist, specifically, that the another user is on the walk-through near or superimposed on the area where the another user's body exists. The information indicating that the user is on the walk-through is not limited to the text information, and may be symbol information or an image such as an icon.

In step S507, the combining unit 213 generates a mixed reality image by combining the virtual image generated by the virtual image generation unit 212 and the real environment image. The combining unit 213 also combines an image of the avatar at a position of the virtual viewpoint of the another user during the walk-through. The combining unit 213 outputs the generated mixed reality image to the terminal 202.

The terminal 202 presents the output mixed reality image to the own user. Specifically, the display unit 204 of the terminal 202 displays the mixed reality image to present it to the own user. The mixed reality image displayed on the display unit 204 includes the image indicating that the virtual viewpoint of the another user is different from the actual viewpoint of the another user at the position corresponding to the actual viewpoint of the another user, so that the own user can easily understand that the virtual viewpoint of the another user is not located at the position of the actual viewpoint. Accordingly, it is possible to eliminate a discrepancy in a relationship between the actual viewpoint and the virtual viewpoint of the another user during the walk-through in mixed reality or augmented reality.

In a case where the information about the actual viewpoint the another user and the information about the virtual viewpoint of the another user are the same or substantially the same, the virtual image generation unit 212 can omit processing for generating a video effect based on the information about the actual viewpoint of the another user.

Second Exemplary Embodiment

According to the present exemplary embodiment, diminished reality in which an area where another user exists is changed to a background image is applied as a video effect based on information about an actual viewpoint of the another user. If an own user observes the another user, the another user's body seems to disappear, so that the own user can easily understand that a virtual viewpoint of the another user is not located at a position of the actual viewpoint.

Figure 6:
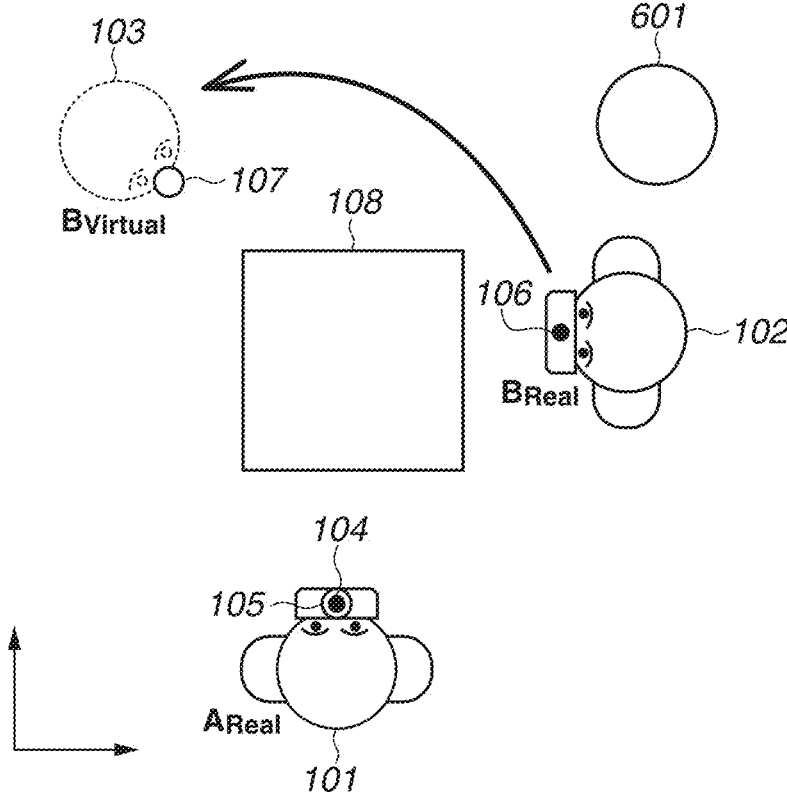
FIG. 6 is a plan view schematically illustrating a situation according to a second exemplary embodiment.

FIG. 6 is a plan view schematically illustrating a situation of mixed reality or augmented reality to which the present exemplary embodiment is applied. Configurations similar to those in FIG. 1 are denoted by the same reference numerals, and descriptions thereof are omitted as appropriate. Here, a background object 601 is arranged behind the body of the user B 102 during a walk-through as viewed from the user A 101. The background object 601 is a real object arranged within or around a mixed reality experience space.

Figure 7:
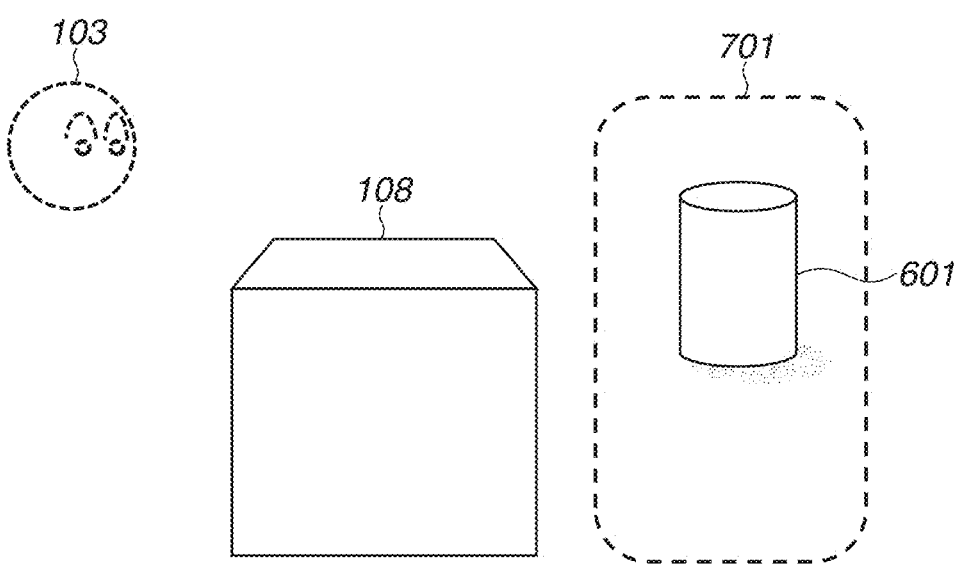
FIG. 7 schematically illustrates a mixed reality image viewed from an own user.

FIG. 7 schematically illustrates a mixed reality image viewed from the actual viewpoint of the user A 101. An image 701 of the background object 601 that can be observed in a case where the body of the user B 102 does not exist is displayed in the area where the body of the user B 102 exists. Further, the avatar 103 of the user B 102 is displayed at the position and orientation of the virtual viewpoint of the user B 102.

Figure 8:
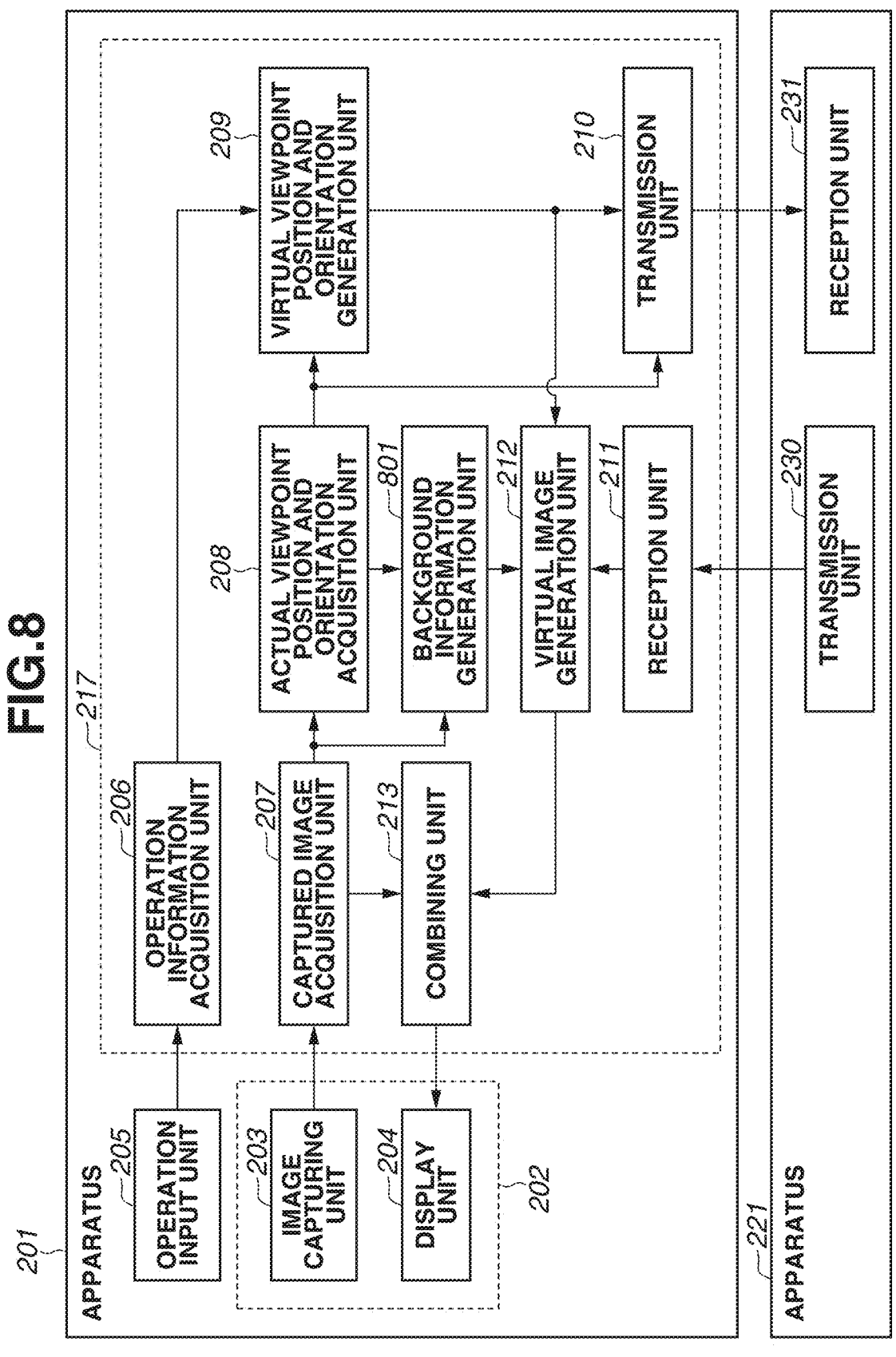
FIG. 8 illustrates a functional configuration of an information processing system according to the second exemplary embodiment.

FIG. 8 illustrates an example of the functional configuration of the information processing system. Configurations similar to those according to the first exemplary embodiment are denoted by the same reference numerals, and descriptions thereof are omitted as appropriate. Further, a hardware configuration of the information processing apparatus 217 is similar to that according to the first exemplary embodiment, and descriptions thereof are omitted as appropriate.

A background information generation unit 801 is added to the information processing apparatus 217 of the apparatus 201.

The background information generation unit 801 reconstructs background information of a case where the another user does not exist based on an image captured by the image capturing unit 203, information about the position and orientation of the actual viewpoint acquired by the actual viewpoint position and orientation acquisition unit 208, and information of a natural feature point in a case where SLAM is used.

Figure 9:
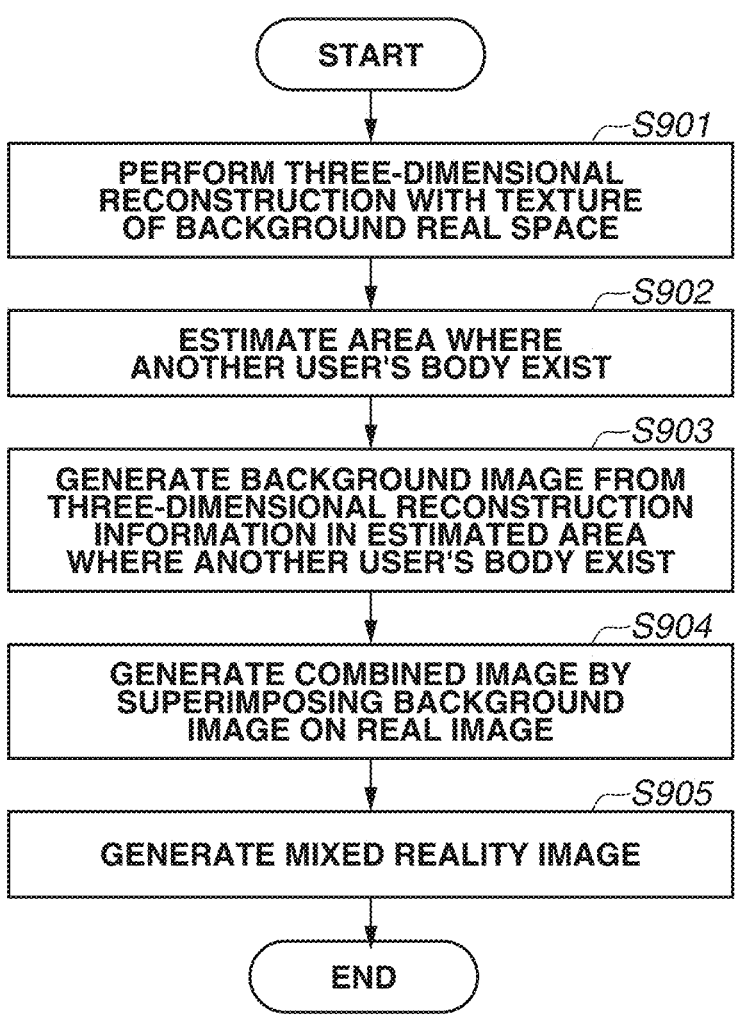
FIG. 9 is a flowchart illustrating processing by the information processing apparatus.

Next, an example of processing by the information processing apparatus 217 is described with reference to a flowchart in FIG. 9. The flowchart in FIG. 9 is, for example, a flowchart that follows the processing in step S504 in the flowchart in FIG. 5.

In step S901, the background information generation unit 801 generates the background information by performing three-dimensional reconstruction with a texture of a background real space. For example, as a method of three-dimensional reconstruction, there is a method using structure from motion (SfM) based on the information about the position and orientation of the actual viewpoint and the real image, and a method for using a natural feature point acquired in a process of using SLAM. Further, if the image capturing unit 203 is a stereo camera, the background information may be generated based on information of the stereo camera. Specifically, depth information in an image is generated from the information of the stereo camera, and point cloud information generated from the depth information is combined between frames by applying an iterative closest point (ICP) algorithm or by using the position and orientation of the actual viewpoint. The background information generation unit 801 generates the background information by converting three-dimensional reconstruction information into a mesh and also by associating vertices of the mesh with the real image captured during three-dimensional reconstruction and creating a texture. However, the method of three-dimensional reconstruction is not limited, and any method may be used.

The background information may be generated using a simplified method that does not perform three-dimensional reconstruction. For example, there is a method of considering a background space as a polyhedron such as a sphere or a cube. Specifically, an image of the background space captured in advance using a fish eye camera is pasted inside the polyhedron as a texture. Alternatively, there is a method for mapping an image that can be acquired by looking around with the image capturing unit 203 to the inside of the polyhedron according to the direction of the image capturing unit 203, using the image capturing unit 203 and the position and orientation of the actual viewpoint. The simplified method that does not perform three-dimensional reconstruction lacks accuracy, but it is useful if computational resources to perform three-dimensional reconstruction are insufficient.

In step S902, the virtual image generation unit 212 estimates an area where the another user's body exists based on the information about the position and orientation of the actual viewpoint of the another user. According to the present exemplary embodiment, in order to paste a background image to the estimated area, the estimated area is calculated as two-dimensional coordinates of vertices of an outline of the another user on an image to be presented to the own user. Specifically, first, in a case where the position of the actual viewpoint of the another user during the walk-through, a foot position of the another user, a position and orientation of a body part of the another user are acquired, a group of position information in a three-dimensional world coordinate system including the position and orientation of the body part of the another user is acquired. As the method for estimating the foot position, the method for estimating presence of the feet described in step S505 according to the first exemplary embodiment can be used. Next, the acquired group of position information is projected onto a two-dimensional image on the image to be presented to the user, and an area including the another user's body is generated from the projected group of position information. For example, a margin amount on the two-dimensional image is determined using distance information to the position of the actual viewpoint of the another user, and four vertices at upper right and upper left of the actual viewpoint position and lower right and lower left of the foot position are calculated based on the determined margin amount. Then, a rectangular area that includes the another user's body is generated using the calculated vertex information, so that it is possible to estimate the area where the another user's body exists. However, a shape of the another user's area is not limited, and any shape may be used. Further, the calculation process and method are not limited as long as the same result as the area estimation described above can be acquired.

In step S903, the background information generation unit 801 generates a background image generated from the three-dimensional reconstruction information in the estimated area where the another user's body exist. Specifically, the background information generation unit 801 generates the background image by drawing the background information generated in step S901 within the area estimated in step S902 from the viewpoint of the own user who observes.

In step S904, the virtual image generation unit 212 generates a combined image of the real space by superimposing the generated background image on the real image. Thus, the combined image is generated in which the estimated area where the another user's body exists is changed to the background image. According to the present exemplary embodiment, since the another user's body during the walk-through is represented as if it did not exist, if the observing own user comes closer to the another user's body during the walk-through, it is assumed that the two users may come into contact with each other. Thus, the virtual image generation unit 212 changes the background image according to a positional relationship between the position of the actual viewpoint of the own user and the position of the actual viewpoint of the another user during the walk-through. Specifically, the virtual image generation unit 212 makes the background image transparent in a case where a distance between the actual viewpoints is a predetermined distance or less, and changes transparency of the background image to increase it continuously or stepwise according to the distance between the actual viewpoints. In a case where the distance between the actual viewpoints is the predetermined distance or less, color of the background image may be changed, or may be changed continuously or stepwise according to the distance between the actual viewpoints. Further, it is not limited to the overall color of the background image, but color of an outline of the background image may be changed. Furthermore, the combining unit 213 may instruct the terminal 202 to sound an alarm if the distance between the actual viewpoints is the predetermined distance or less, or depending on the distance between the actual viewpoints.

In step S905, the combining unit 213 generates a mixed reality image by drawing a virtual three-dimensional model on the combined image generated by the virtual image generation unit 212. The combining unit 213 also combines an image of the avatar at a position of the virtual viewpoint of the another user during the walk-through. The combining unit 213 outputs the generated mixed reality image to the terminal 202.

The terminal 202 presents the output mixed reality image to the own user. Specifically, the display unit 204 of the terminal 202 displays the mixed reality image to present it to the own user. In the mixed reality image displayed on the display unit 204, the background image is displayed on the position corresponding to the actual viewpoint of the another user, so that the own user can easily understand that the virtual viewpoint of the another user is not located at the position of the actual viewpoint. Accordingly, it is possible to eliminate a discrepancy in a relationship between the actual viewpoint and the virtual viewpoint of the another user during the walk-through in mixed reality or augmented reality.

Third Exemplary Embodiment

According to the present exemplary embodiment, a virtual space or a virtual three-dimensional model is transformed or processed as a video effect based on information about an actual viewpoint of another user. If an own user observes the virtual three-dimensional model, a part of the three-dimensional model is displayed as the virtual three-dimensional model viewed from a virtual viewpoint of the another user, so that the own user can easily understand that the virtual viewpoint of the another user is not located at a position of the actual viewpoint.

Figure 10:
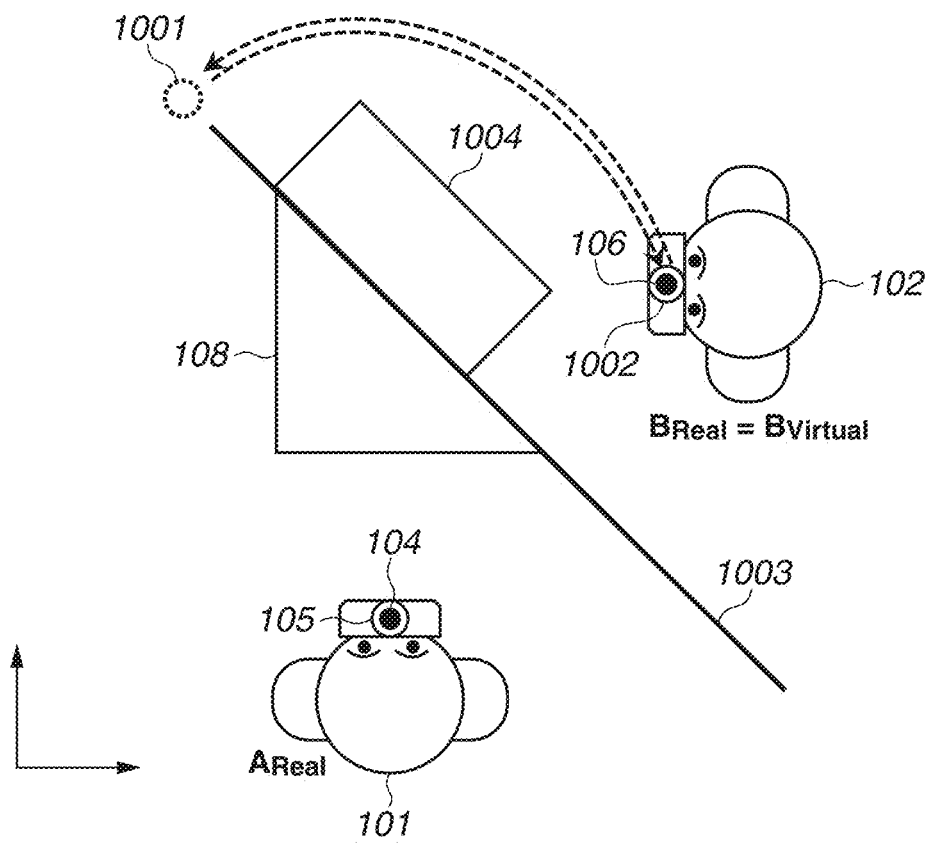
FIG. 10 is a plan view schematically illustrating a situation according to a third exemplary embodiment.

FIG. 10 is a plan view schematically illustrating a situation of mixed reality or augmented reality to which the present exemplary embodiment is applied. Configurations similar to those in FIG. 1 are denoted by the same reference numerals, and descriptions thereof are omitted as appropriate.

Figure 11:
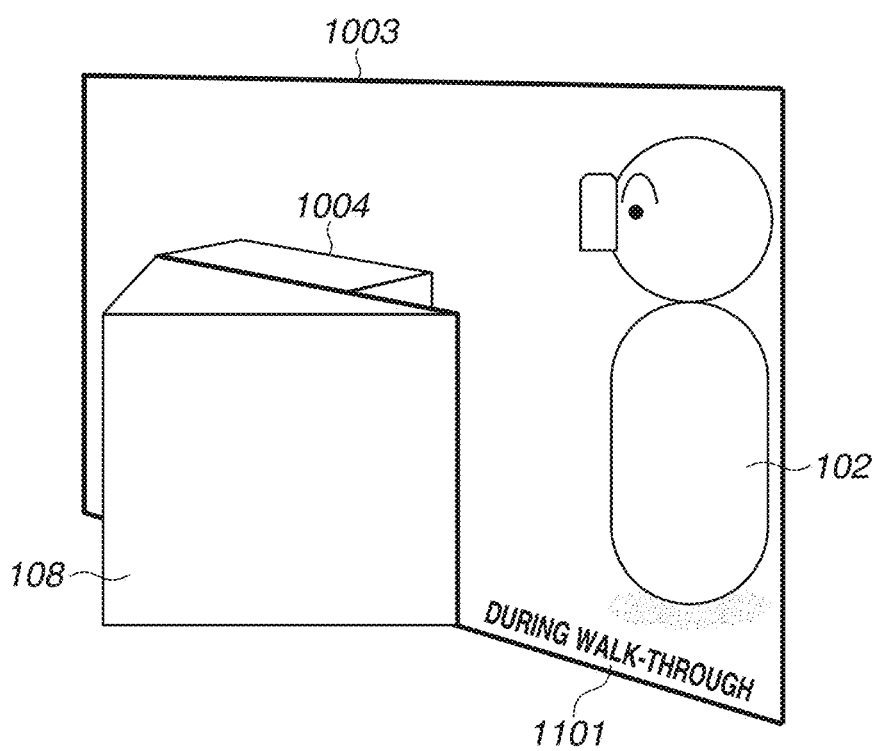
FIG. 11 schematically illustrates a mixed reality image viewed from an own user.

FIG. 11 schematically illustrates a mixed reality image viewed from the actual viewpoint of the user A 101.

It is assumed that the user B 102 moves to a virtual viewpoint 1001 by a walk-through. At this time, the user B 102 looks at the virtual model 108 from a position and orientation of the virtual viewpoint 1001. Here, if the virtual viewpoint 1001 can return to the position and orientation of the actual viewpoint 106 of the user B 102, namely a position and orientation of a virtual viewpoint 1002 while maintaining a relative positional relationship between the virtual viewpoint 1001 and the virtual model 108, a position discrepancy between the actual viewpoint and the virtual viewpoint can be eliminated. However, such a virtual model causes a geometric contradiction.

According to the present exemplary embodiment, a virtual space itself or a virtual three-dimensional model is transformed or processed. Specifically, a boundary surface 1003 is set between a position of the actual viewpoint 104 of the user A 101 and a position of the actual viewpoint 106 of the user B 102, and the virtual space is divided across the boundary. Then, a coordinate system is set in which a relative position and orientation relationship between the virtual viewpoints 105 and 1001 and the virtual model is maintained in each of the virtual spaces of the user A 101 and the user B 102. Accordingly, a virtual model 1004 is divided and displayed in the virtual space on the user B 102 side, and the positions of the virtual viewpoint 1002 and the actual viewpoint 106 of the user B 102 match.

Figure 12:
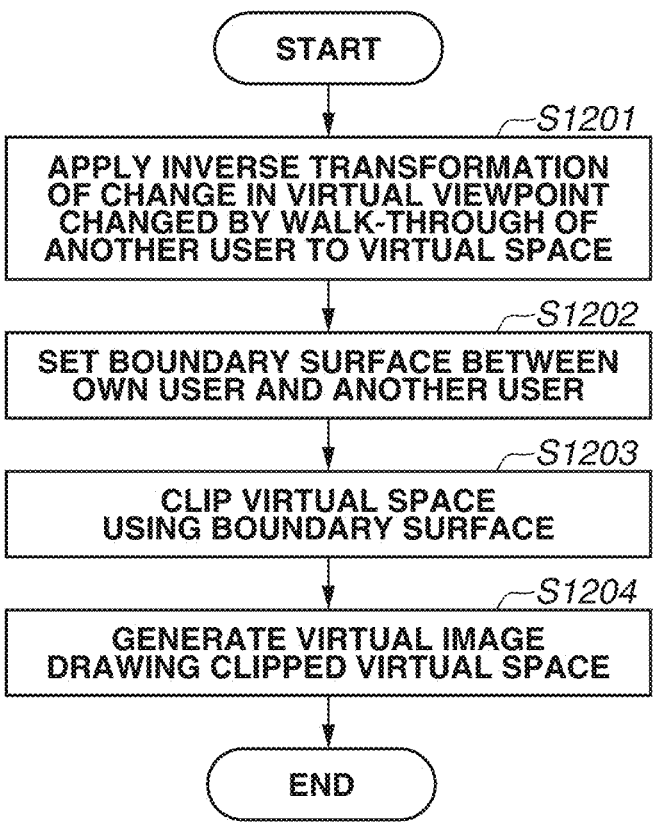
FIG. 12 is a flowchart illustrating processing by the information processing apparatus.

Next, an example of processing by the information processing apparatus 217 is described with reference to a flowchart in FIG. 12. The flowchart in FIG. 12 is, for example, a flowchart that follows the processing in step S503 in the flowchart in FIG. 5. A functional configuration of the information processing system and a hardware configuration of the information processing apparatus 217 are similar to those according to the first exemplary embodiment, and descriptions thereof are omitted as appropriate.

In step S1201, the virtual image generation unit 212 calculates an inverse transformation matrix corresponding to a change from the position and orientation of the actual viewpoint to the position and orientation of the virtual viewpoint according to the walk-through of the another user. Next, the virtual image generation unit 212 applies the calculated inverse transformation matrix to the virtual space to generate a virtual space to which the inverse transformation is applied. The virtual image generation unit 212 may apply the calculated inverse transformation matrix to the virtual three-dimensional model in the virtual space to generate a virtual three-dimensional model to which the inverse transformation is applied.

In step S1202, the virtual image generation unit 212 uses the information about the position and orientation of the actual viewpoint of the own user and the information about the position and orientation of the actual viewpoint of the another user to set a boundary surface between the positions of the actual viewpoints of both users.

Specifically, the virtual image generation unit 212 first defines a work surface with the vertical direction as its normal line. In a case where the floor surface described in the first exemplary embodiment is estimated, the floor surface is defined as the work surface. If there is no floor surface information, a plane of which a normal line is an average of vectors in an upward direction of each user's visual field or any of X, Y, and Z axes of the world coordinate system that makes the smallest angle with the average vector, and which passes through appropriate coordinates is defined as the work surface. Next, the virtual image generation unit 212 calculates a foot of a perpendicular of each user's actual viewpoint to the work surface. If there are two users, a plane that passes through a perpendicular bisector of the foot of the perpendicular and is perpendicular to the work surface is defined as the boundary surface. If there are three or more users, a Voronoi boundary with respect to the foot of the perpendicular for each user is generated on the work surface, and a plane that passes through the Voronoi boundary and is perpendicular to the work surface is defined as the boundary surface. In order to generate the Voronoi boundary, the actual viewpoint of the own user and the actual viewpoint of the another user are projected onto the work surface as a predetermined plane, and the Voronoi boundary can be calculated based on the projected points.

In step S1203, the virtual image generation unit 212 clips the virtual space based on the set boundary surface. Here, a case where the virtual three-dimensional model included in the virtual space is clipped is described with reference to FIG. 10. First, the virtual model 108 on the user A 101 side clips the user B 102 side at the boundary surface 1003 with respect to the boundary surface 1003 generated between the user A 101 and the user B 102. Meanwhile, the virtual model 1004 to which the inverse transformation is applied on the user B 102 side is clips the user A 101 side at the boundary surface 1003.

In step S1204, the virtual image generation unit 212 generates a virtual image drawn from the viewpoint of the own user observing the clipped virtual space. The generated virtual image is an image in which the position of the virtual viewpoint of the another user appears to match the position of the actual viewpoint of the another user if the another user is viewed from the actual viewpoint of the own user. At this time, the boundary surface may be added to the virtual image, or an intersection line between the boundary surface and the work surface may be added as a boundary line so that the own user can recognize that the virtual space or the virtual three-dimensional model is clipped based on the boundary surface.

The virtual image generation unit 212 also generates text information 1101, near the boundary surface or the boundary line, indicating that the virtual viewpoint of the another user is different from the actual viewpoint of the another user, specifically, that the another user is on the walk-through as illustrated in FIG. 11. The information indicating that the user is on the walk-through is not limited to the text information, and may be symbol information or an image such as an icon.

The combining unit 213 outputs the virtual image generated by the virtual image generation unit 212 to the terminal 202. The combining unit 213 may generate a mixed reality image by combining the virtual image generated by the virtual image generation unit 212 and the real environment image, and output the generated mixed reality image to the terminal 202 as necessary.

The terminal 202 presents the output virtual image or mixed reality image to the own user. Specifically, the display unit 204 of the terminal 202 displays the virtual image or the mixed reality image to present it to the own user. In the image displayed on the display unit 204, the virtual three-dimensional model divided by the boundary surface is displayed, so that the own user can easily understand that the virtual viewpoint of the another user is not located at the position of the actual viewpoint. Accordingly, it is possible to eliminate a discrepancy in a relationship between the actual viewpoint and the virtual viewpoint of the another user during the walk-through in mixed reality or augmented reality.

According to the present exemplary embodiment, the case where the virtual space is clipped at the boundary surface is described, but a mixed reality image may be generated by clipping a virtual three-dimensional model at a boundary surface and combining the clipped virtual three-dimensional model and a real environment image.

In addition, the case is not limited to clipping the virtual three-dimensional model on the boundary surface, and an offset may be set to the boundary surface to provide a gap between the boundaries, or conversely, the virtual three-dimensional model may overlap the boundary surface. Further, a side surface of a cylinder having a predetermined radius around a vertical axis passing through the actual viewpoint of the own user or the another user may be set as the boundary surface.

Further, depending on a distance between the own user and the boundary surface, transparency may be added to the boundary surface continuously or stepwise, or color of the boundary surface may be changed.

Depending on a position and an orientation moved by the walk-through, the entire boundary surface may be blocked by the virtual three-dimensional model, making it impossible to visually recognize what action the user takes. In this case, an area of the another user's body is estimated using the method described according to the first exemplary embodiment. Then, in a case where the virtual three-dimensional model intersects an area connecting the estimated area and the actual viewpoint of the own user observing the another user, the area of the virtual three-dimensional model including the intersecting portion or a periphery of the intersecting portion may be made transparent or translucent.

Other Exemplary Embodiment

The present invention can be realized by executing following processing. Specifically, a program for realizing one or more functions of the above-described exemplary embodiments is supplied to a system or an apparatus via a network or a storage medium and one or more processors in a computer of the system or the apparatus reads and executes the program. Further, the present invention can also be realized by a circuit that realizes one or more functions (e.g., an application specific integrated circuit (ASIC)).

The present invention has been described above with reference to various exemplary embodiments, but the present invention is not limited only to these exemplary embodiments. The present invention can be modified within the scope of the present invention, and a part of the configuration or a part of the processing of each exemplary embodiment can be combined with the other exemplary embodiments.

In each of the exemplary embodiments described above, in a case where a stereo image is presented to the own user, the processing in the flowchart according to each exemplary embodiment is appropriately performed on right and left images.

In each of the exemplary embodiments described above, the case is described where the apparatuses 201 and 221 have the same configuration, but the apparatuses 201 and 221 may have different configurations without being limited to this case. For example, the apparatus 201 does not have the walk-through function, and the apparatus 221 may have the walk-through function.

The present invention is not limited to the above embodiments and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a discrepancy in a relationship between a virtual viewpoint and an actual viewpoint of another user can be eliminated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus that shares with another user a space where a virtual three-dimensional model is presented, the information processing apparatus comprising:
at least one processor and/or at least one circuit configured to:
acquire information about an actual viewpoint of the another user; and
generate, in a case where a virtual viewpoint of the another user is different from the actual viewpoint of the another user because a walk-through function is used, a combined image in which an image of an avatar is arranged at a position of the virtual viewpoint of the another user and a real image corresponding to a position of the actual viewpoint of the another user is processed.

2. The information processing apparatus according to claim 1, wherein, in the generating, an area where the another user exists is estimated based on the information about the actual viewpoint of the another user, and the combined image is generated by processing the real image of the estimated area.

3. The information processing apparatus according to claim 2, wherein, in the generating, the processing includes changing the estimated area to a different color.

4. The information processing apparatus according to claim 2, wherein, in the generating, the processing includes changing the estimated area to a background image.

5. The information processing apparatus according to claim 4, wherein, in the generating, the processing includes superimposing the background image on the real image in the estimated area, and changing transparency of the background image according to a relationship between a position of an actual viewpoint of an own user and the position of the actual viewpoint of the another user.

6. The information processing apparatus according to claim 4, wherein the background image is generated on a basis of three-dimensional reconstruction information of a background real space.

7. The information processing apparatus according to claim 6, wherein, in the generating, in a case where a distance between a position of an actual viewpoint of an own user and a position of the actual viewpoint of the another user is equal to or less than a predetermined distance, transparency of the background image is changed and an alarm is sounded.

8. The information processing apparatus according to claim 2, wherein, in the generating, a text, a symbol or an icon which indicates that the actual viewpoint of the another user is different from the virtual viewpoint of the another user is generated near the estimated area or in such a manner as to be superimposed on the estimated area.

9. The information processing apparatus according to claim 1, wherein, in the generating, the combined image is not generated in a case where the virtual viewpoint of the another user and the actual viewpoint of the another user match with each other.

10. An information processing apparatus that shares with another user a space where a virtual three-dimensional model is presented, the information processing apparatus comprising at least one processor and/or at least one circuit configured to:

acquire information about an actual viewpoint of the another user; and generate, in a case where a virtual viewpoint of the another user is different from the actual viewpoint of the another user because a walk-through function is used, an image as a video effect, wherein the image is generated such that the space or the virtual three-dimensional model is transformed based on the information about the actual viewpoint of the another user and information about the virtual viewpoint of the another user, wherein the image is generated such that a side of the another user is transformed across a boundary set between an actual viewpoint of an own user and the actual viewpoint of the another user in the space or the virtual three-dimensional model, and wherein the boundary is set across a Voronoi boundary that is calculated based on points acquired by projecting the actual viewpoint of the own user and the actual viewpoint of the another user onto a predetermined plane.

11. The information processing apparatus according to claim 10, wherein, in the generating, in a case where the another user is viewed from the actual viewpoint of the own user, the image in which the space or the virtual three-dimensional model is transformed is generated so that a position of the virtual viewpoint of the another user appears to match a position of the actual viewpoint of the another user.

12. The information processing apparatus according to claim 10, wherein, in the generating, an inverse transformation corresponding to a change from the actual viewpoint of the another user to the virtual viewpoint of the another user caused by the walk-through function is applied to the space or the virtual three-dimensional model.

13. The information processing apparatus according to claim 10, wherein, in the generating, a plane that is perpendicular to the predetermined plane onto which the actual viewpoint of the own user and the actual viewpoint of the another user are projected onto and passes through the Voronoi boundary is set as a boundary surface.

14. The information processing apparatus according to claim 13, wherein, in the generating, the space or the virtual three-dimensional model is clipped on a basis of the boundary surface and the boundary surface or a boundary line as an intersection line between the boundary surface and the predetermined plane is added to the generated image.

15. A method for processing information for sharing with another user a space where a virtual three-dimensional model is presented, the method comprising: acquiring information about an actual viewpoint of the another user; and generating, in a case where a virtual viewpoint of the another user is different from the actual viewpoint of the another user because a walk-through function is used, a combined image in which an image of an avatar is arranged at a position of the virtual viewpoint of the another user and a real image corresponding to a position of the actual viewpoint of the another user is processed.

16. A non-transitory computer-readable storage medium storing a program that causes a computer to execute a method for processing information for sharing with another user a space where a virtual three-dimensional model is presented, the method comprising: acquiring information about an actual viewpoint of the another user; and generating, in a case where a virtual viewpoint of the another user is different from the actual viewpoint of the another user because a walk-through function is used, a combined image in which an image of an avatar is arranged at a position of the virtual viewpoint of the another user and a real image corresponding to a position of the actual viewpoint of the another user is processed.

\* \* \* \* \*